US012655046B2

(12) United States Patent
Liang

(10) Patent No.: US 12,655,046 B2
(45) Date of Patent: Jun. 16, 2026

(54) HIGH RECOVERY ELECTRODIALYSIS METHOD

(71) Applicant: Evoqua Water Technologies LLC, Pittsburgh, PA (US)

(72) Inventor: Li-Shiang Liang, Harvard, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 911 days.

(21) Appl. No.: 17/284,440

(22) PCT Filed: Oct. 8, 2019

(86) PCT No.: PCT/US2019/055211
§ 371 (c)(1),
(2) Date: Apr. 9, 2021

(87) PCT Pub. No.: WO2020/076837
PCT Pub. Date: Apr. 16, 2020

(65) Prior Publication Data
US 2021/0340031 A1     Nov. 4, 2021

Related U.S. Application Data

(60) Provisional application No. 62/743,194, filed on Oct. 9, 2018.

(51) Int. Cl.
*C02F 1/469* (2023.01)
*B01D 61/42* (2006.01)
(Continued)

(52) U.S. Cl.
CPC .......... *C02F 1/4693* (2013.01); *B01D 61/423* (2022.08); *B01D 61/46* (2013.01);
(Continued)

(58) Field of Classification Search
CPC .. C02F 1/4691; C02F 1/4693; C02F 2209/40; C02F 2301/08; C02F 2301/043;
(Continued)

(56) References Cited

U.S. PATENT DOCUMENTS 3,933,610 A * 1/1976 Ehara ..................... B01D 61/44
204/529
4,925,541 A * 5/1990 Giuffrida ............... B01D 61/48
204/524
(Continued)

FOREIGN PATENT DOCUMENTS

JP     2001-191080 A     7/2001
JP     2002-86152 A      3/2002
(Continued)

OTHER PUBLICATIONS

Chang et al. "Relationships of Electrical Conductivity with Total Dissolved Salts and Cation Concentration of Sulfate-Dominant Soil Extracts" Can. J. Soil Sci. 63: 79-86 (Feb. 1983) (Year: 1983).*
(Continued)

*Primary Examiner* — Luan V Van
*Assistant Examiner* — Alexander R. Parent

(57)     ABSTRACT

A water treatment system for brackish water is disclosed. The water treatment system includes a first electrochemical separation stage fluidly connected to a second, downstream electrochemical separation stage, with the concentrate outlet of the second electrochemical separation stage fluidly connectable to the concentration compartment of the first electrochemical separation stage and a control system configured to regulate feed directed to the concentration compartments of the first and the second electrochemical separation stages. Methods of treating brackish water to produce potable water and methods of treating brackish water using systems of the invention are disclosed. The Donnan potential difference and osmotic water losses are (Continued)

lessened by controlling a source and a flowrate of a make-up feed water directed to concentration compartments of first and the second electrochemical separation stages of the systems.

22 Claims, 3 Drawing Sheets

(51) Int. Cl.
   *B01D 61/46* (2006.01)
   *B01D 61/54* (2006.01)
   *C02F 103/08* (2006.01)

(52) U.S. Cl.
   CPC ............ *B01D 61/54* (2013.01); *C02F 1/4691* (2013.01); *B01D 61/422* (2013.01); *B01D 2311/2512* (2022.08); *B01D 2311/2513* (2022.08); *B01D 2311/252* (2022.08); *B01D 2311/2532* (2022.08); *B01D 2313/54* (2013.01); *B01D 2317/02* (2013.01); *C02F 2103/08* (2013.01); *C02F 2209/10* (2013.01); *C02F 2209/40* (2013.01); *C02F 2301/043* (2013.01); *C02F 2301/046* (2013.01); *C02F 2301/08* (2013.01)

(58) Field of Classification Search
   CPC .............. C02F 2301/046; C02F 1/4695; C02F 2301/04; B01D 61/422; B01D 61/423; B01D 2311/25; B01D 2311/251; B01D 2311/2513
   See application file for complete search history.

(56) References Cited

U.S. PATENT DOCUMENTS

| | | | | |
|---|---|---|---|---|
| 6,423,205 | B1 * | 7/2002 | Akahori | B01D 61/48 |
| | | | | 205/636 |
| 9,556,044 | B2 * | 1/2017 | Fu | C02F 1/008 |
| 11,478,752 | B2 * | 10/2022 | Li | B01D 61/46 |
| 2006/0231406 | A1 * | 10/2006 | Freydina | B01D 61/54 |
| | | | | 204/632 |
| 2007/0215474 | A1 * | 9/2007 | Batchelder | B01D 61/44 |
| | | | | 204/524 |
| 2010/0089756 | A1 | 4/2010 | Wilkins et al. | |
| 2014/0183045 | A1 | 7/2014 | Fu et al. | |
| 2015/0027890 | A1 | 1/2015 | Jha et al. | |
| 2015/0108007 | A1 | 4/2015 | Ganzi et al. | |
| 2015/0344332 | A1 * | 12/2015 | Gu | B01D 61/423 |
| | | | | 204/630 |
| 2018/0162758 | A1 * | 6/2018 | Cantrell | C02F 1/4691 |

FOREIGN PATENT DOCUMENTS

| | | | | |
|---|---|---|---|---|
| JP | 2004-261643 A | 9/2004 | | |
| JP | 2007-203136 A | 8/2007 | | |
| WO | WO-03072229 A1 * | 9/2003 | | B01D 61/50 |
| WO | WO-2015004417 A1 * | 1/2015 | | B01D 61/44 |
| WO | WO-2016028972 A1 * | 2/2016 | | B01D 61/58 |
| WO | 2017137748 A1 | 8/2017 | | |

OTHER PUBLICATIONS

Tsiakis et al. "Optimal design of an electrodialysis brackish water desalination plant" Desalination 173 (2005) 173-186 (Year: 2005).*
Qasem et al. "Improvement in design of electrodialysis desalination plants by considering the Donnan potential." vol. 441, Sep. 1, 2018, pp. 62-76 (Year: 2018).*
JP Office Action in corresponding 2021-512851, dated Jan. 16, 2024.
Unknown, "Communication pursuant to Article 94(3) EPC", European Patent No. 19871943.7, mailed Dec. 6, 2024.
Lee, Sojin, "Notice to Submit Response", South Korean Patent Application No. 10-2021-7013760, mailed Apr. 28, 2025.
Sugimura, Kenji, "Notice of Refusal", Japanese Patent Application No. 2024-111013, mailed Oct. 28, 2025, 6 pages.
Cuerrier, Pierre, "Requisition by the Examiner", Canadian Patent Application No. 3112216, mailed Nov. 17, 2025, 3 pages.

* cited by examiner

HIGH RECOVERY ELECTRODIALYSIS METHOD

CROSS-REFERENCE TO RELATED APPLICATIONS

This application claims priority under 35 U.S.C. § 119(e) to U.S. Provisional Application Ser. No. 62/743,194, titled "HIGH RECOVERY ELECTRODIALYSIS METHOD," filed on Oct. 9, 2018, which is incorporated herein by reference in its entirety for all purposes.

FIELD OF TECHNOLOGY

Aspects and embodiments disclosed herein are generally directed to water treatment systems and, more specifically, to water treatment systems utilizing electrodialysis with high water recovery, high recovered water purity, and low total energy consumption.

SUMMARY

In accordance with an aspect, there is provided a system for treating brackish water. The system may comprise a first electrochemical separation stage having a dilution compartment inlet fluidly connectable to a source of brackish water, a concentration compartment, a diluate outlet, and a concentrate outlet. The system may further comprise a second electrochemical separation stage positioned downstream of the first electrochemical separation stage and having a dilution compartment inlet fluidly connectable to the diluate outlet of the first electrochemical separation stage, a concentration compartment, a product water outlet, and a concentrate outlet, the concentrate outlet of the second electrochemical separation stage fluidly connectable to the concentration compartment of the first electrochemical separation stage. The system may additionally comprise a control system configured to regulate feed directed to the concentration compartments of the first and the second electrochemical separation stages, and to maintain an overall product water recovery rate of greater than about 90% having a concentration of dissolved salts of less than about 500 ppm.

In some embodiments, the source of brackish water is further fluidly connectable to the concentration compartment of the second electrochemical separation stage. In some embodiments, the diluate outlet of the first electrochemical separation stage is further fluidly connectable to the concentration compartment of the second electrochemical separation stage.

In further embodiments, the system includes a break tank fluidly connectable between the concentration compartments of the first and the second electrochemical separation stages. In further embodiments, the system includes a sensor fluidly connectable to the concentration outlets of the first and the second electrochemical separation stages, the sensor configured to measure at least one of the total dissolved salt concentration (TDS) and flow rate.

In some embodiments, the control system is electrically connected to the sensor and configured to regulate a volume of concentrate from the second electrochemical separation stage in response to the sensor measurement of the concentrate from the first electrochemical separation stage. In some embodiments, the control system is electrically connected to the sensor and configured to regulate a volume of diluate from the first electrochemical separation stage in response to the sensor measurement of the concentrate from the second electrochemical separation stage. In some embodiments, the control system is electrically connected to the sensor and configured to regulate a volume of brackish water feed from the source of brackish water in response to the sensor measurement of the concentrate from the second electrochemical separation stage.

In some embodiments, the control system is configured to maintain a total energy consumption of less than about 4 $kWh/m^3$ of product water. In some embodiments, the control system is configured to lessen the Dorman potential difference between the dilution and the concentration compartments of the first and the second electrochemical separation stages. In some embodiments, the control system is configured to lessen osmotic water losses between the dilution and the concentration compartments of the first and the second electrochemical separation stages.

In accordance with another aspect, there is provided a method of treating brackish water to produce potable water. In some embodiments, the method comprises introducing brackish water from a source of brackish water to an inlet of a first electrochemical separation stage dilution compartment. The method may comprise treating the brackish water in the first electrochemical separation stage to produce a diluate. The method may further comprise determining an amount of the diluate to direct to an inlet of a second electrochemical separation stage dilution compartment. The method may comprise treating the diluate of the first electrochemical separation stage in the second electrochemical separation stage to produce a potable water having a concentration of dissolved salts of less than about 500 ppm. The method may further comprise controlling a source and a flowrate of a make-up feed water directed to concentration compartments of the first and the second electrochemical separation stages to maintain an overall product water recovery rate of greater than about 90%.

In some embodiments, the method may further comprise directing a volume of a concentrate from the concentration compartment of the second electrochemical separation stage to the concentration compartment of the first electrochemical separation stage. In some embodiments, the method may further comprise directing a volume of brackish water from the source of brackish water to the concentration compartment of the second electrochemical separation stage. In some embodiments, the method may further comprise directing a volume from the diluate of the first electrochemical separation stage to the concentration compartment of the second electrochemical separation stage.

In some embodiments, the method may further comprise controlling the source and the flowrate of the make-up feed water directed to the concentration compartments of the first and the second electrochemical separation stages to maintain a total energy consumption of less than about 4 $kWh/m^3$ of product water. In some embodiments, the method may further comprise controlling the source and the flowrate of the make-up feed water directed to the concentration compartments of the first and the second electrochemical separation stages to lessen the Donnan potential difference between the dilution and the concentration compartments of the first and the second electrochemical separation stages. In some embodiments, the method may further comprise controlling the source and the flowrate of the make-up feed water directed to the concentration compartments of the first and the second electrochemical separation stages to lessen osmotic water losses between the dilution and the concentration compartments of the first and the second electrochemical separation stages.

In accordance with another aspect, there is provided a method of treating brackish water. In some embodiments, the method comprises introducing brackish water from a source of brackish water to an inlet of a dilution compartment of a plurality of electrochemical separation modules of a first electrochemical separation stage. The method may comprise treating the brackish water in the first electrochemical separation stage to produce a first diluate and a first concentrate. The method may comprise recovering the first diluate as a product water. The method may further comprise directing the first concentrate to an inlet of a dilution compartment of a plurality of electrochemical separation modules of a second electrochemical separation stage. The method may comprise treating the first concentrate in the second electrochemical separation stage to produce a second diluate and a second concentrate. The method may further comprise controlling a source and a flowrate of a make-up feed water directed to concentration compartments of the first and the second electrochemical separation modules of the first and the second electrochemical separation stages to lessen the Donnan potential difference between the dilution and the concentration compartments of the electrochemical separation modules of the first and the second electrochemical stages.

In some embodiments, the method may further comprise directing a volume of the first concentrate to the concentration compartments of the second electrochemical separation stage. In some embodiments, the method may further comprise directing the second diluate to the source of brackish water. In some embodiments, the method may further comprise directing a volume of brackish water from the source of brackish water to the concentration compartments of the first electrochemical separation stage. In some embodiments, the method may further comprise controlling the source and the flowrate of the make-up feed water directed to the concentration compartments of the first and the second electrochemical separation stages to lessen osmotic water losses between the dilution and the concentration compartments of the electrochemical separation modules of the first and the second electrochemical separation stages. In some embodiments, the method may further comprise controlling the source and the flowrate of the make-up feed water directed to the concentration compartments of the first and the second electrochemical separation stages to maintain an overall product water recovery rate of greater than about 85%. In some embodiments, the method may further comprise controlling the source and the flowrate of the make-up feed water directed to the concentration compartments of the first and the second electrochemical separation stages to maintain a total energy consumption of less than about 1.5 kWh/m$^3$.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
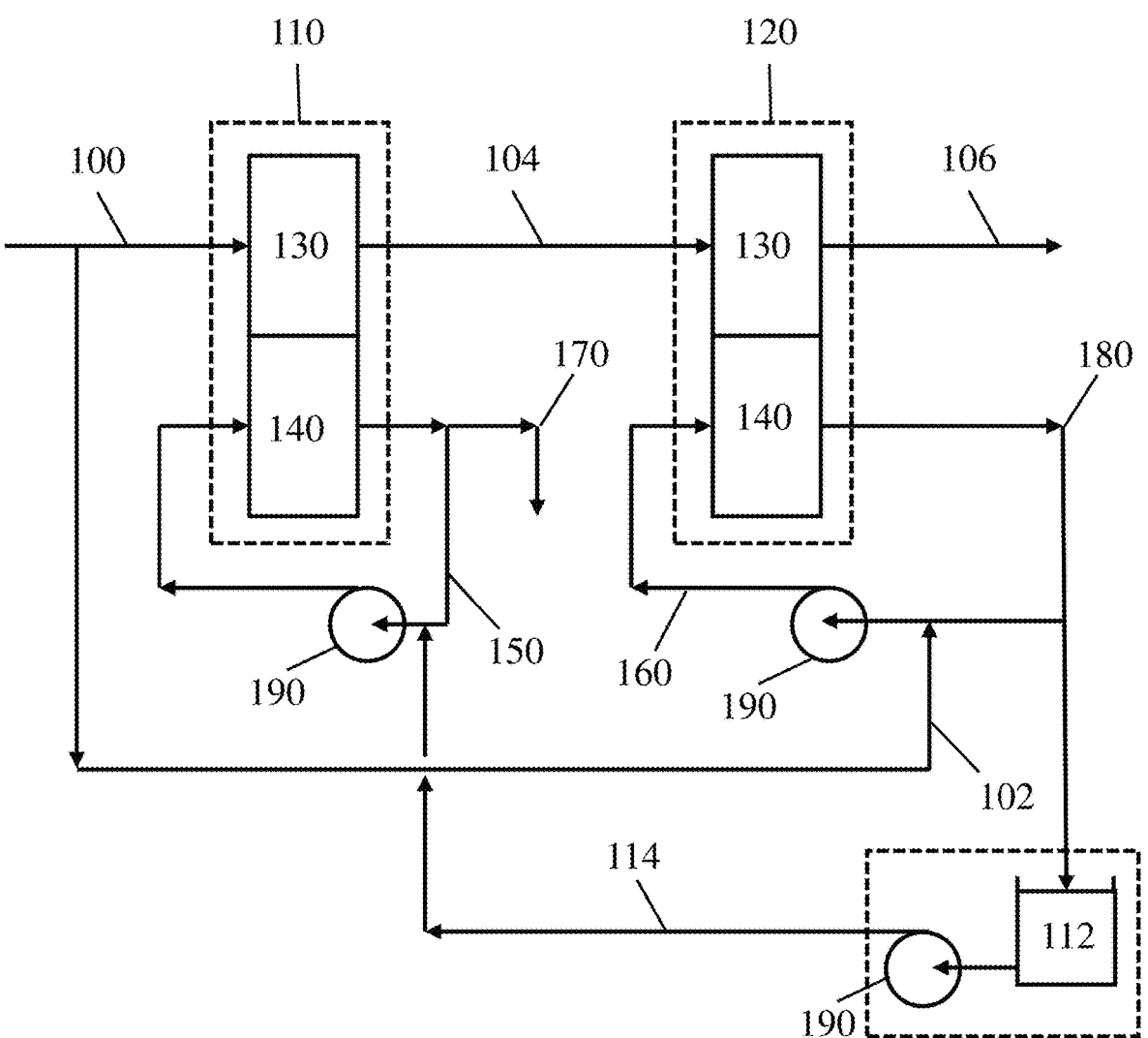
FIG. 1 is a schematic drawing of a water treatment system, in accordance with certain embodiments.

In accordance with an aspect, there is provided a system for treating brackish water using a first electrochemical separation stage and a second electrochemical separation stage positioned downstream of the first electrochemical separation stage. The first electrochemical separation stage includes a dilution compartment having an inlet fluidly connectable to a source of brackish water, a concentration compartment, a diluate outlet, and a concentrate outlet. The second electrochemical separation stage includes a dilution compartment having an inlet fluidly connectable to the diluate outlet of the first electrochemical separation stage, a concentration compartment, a product water outlet, and a concentrate outlet. Systems and methods disclosed herein may further include the concentrate outlet of the second electrochemical separation stage fluidly connectable to the concentration compartment of the first electrochemical separation stage. Systems and methods disclosed herein may additionally include one or more additional electrochemical separation stages.

An electrochemical separation stage refers to a device for purifying fluids using an electrical field and may be commonly used to treat water and other liquids containing dissolved ionic species. Electrochemical separation stages include, but are not limited to, electrodeionization and electrodialysis devices. In some embodiments, the electrochemical device has a plate-and-frame or spiral wound design. Such designs may be used for various types of electrochemical deionization devices including but not limited to electrodialysis and electrodeionization devices. Commercially available electrodialysis devices are typically of plate-and-frame design, while electrodeionization devices may be available in both plate and frame and spiral configurations.

Generally, electrochemical separation stages may employ an electric potential to influence ion transport and remove or reduce a concentration of one or more ionized or ionizable species from a fluid. Electrochemical devices may be operated to promote one or more electrochemical reactions specifically designed to achieve or enhance separation performance. For instance, electrochemical devices may drive ion transport in a specific direction through selectively permeable membranes by allowing ion transport in a specific direction and preventing ion transport in another specific direction. In certain embodiments, electrochemical devices may comprise electrically active membranes, such as semipermeable or selectively permeable ion exchange or bipolar membranes.

Electrodeionization (EDI) systems may further employ electrically active media to separate the one or more ionized or ionizable species from the fluid. The electrically active media typically serves to alternately collect and discharge ionic and/or ionizable species and, in some cases, to facilitate the transport of ions. The transport of ions may occur continuously, for instance by ionic or electronic substitution mechanisms. EDI devices can comprise electrochemically active media of permanent or temporary charge, and may be operated batch-wise, intermittently, continuously, and/or even in reversing polarity modes.

One embodiment of EDI is continuous electrodeionization (CEDI). CEDI devices are EDI devices known to those skilled in the art that operate in a manner in which water purification can proceed continuously, while ion exchange material is continuously recharged. CEDI techniques may include processes such as continuous deionization, filled cell electrodialysis, or electrodiaresis. Under specific controlled voltage and salinity conditions in CEDI systems water molecules can be split to generate hydrogen or hydronium ions or species and hydroxide or hydroxyl ions or species that can regenerate ion exchange media in the device and thus facilitate the release of the trapped species therefrom. In this way, a water stream to be treated may be continuously purified without requiring chemical recharging of ion exchange resin.

Electrodialysis (ED) devices operate similarly to EDI devices (i.e., by alternately collecting and discharging species in batch-wise processes, intermittently, continuously, or in reversing polarity modes). However, ED devices typically do not contain electroactive media between the membranes. Because of the lack of electroactive media, the operation of ED devices may be hindered on feed waters of low salinity having an elevated electrical resistance. Also, because the operation of ED on high salinity feed waters can result in elevated electrical current consumption, ED devices have heretofore been most effectively used on source waters of intermediate salinity. In ED based systems, because there is no electroactive media, splitting water is inefficient and operating in such a regime is generally avoided.

In certain electrochemical separation stages, such as those employed in systems and methods disclosed herein, a plurality of adjacent cells or compartments may be separated by selectively permeable membranes that allow the passage of either positively or negatively charged species, but typically not both. Dilution compartments are typically interspaced with concentrating or concentration compartments in such devices. As water flows through the dilution compartments, ionic and other charged species may be drawn into concentration compartments under the influence of an electric field, such as a DC field. Positively charged species may be drawn toward a cathode, generally located at one end of a stack of multiple dilution and concentration compartments. Negatively charged species may be drawn toward an anode of such devices, generally located at the opposite end of the stack of compartments. The electrodes may be housed in electrolyte compartments that are generally partially isolated from fluid communication with the dilution and/or concentration compartments. Once in a concentration compartment, charged species may be trapped by a barrier of selectively permeable membranes, at least partially defining the concentration compartment. For example, anions may be prevented from migrating further toward the cathode, out of the concentration compartment, by a cation selective membrane. Similarly, cations may be prevented from migrating further toward the anode, out of the concentration compartment, by an anion selective membrane. Once captured in the concentration compartment, trapped charged species may be removed in a concentrate stream.

A set of a dilution compartment, a cation selective membrane, a concentration compartment, and an anion selective membrane may be called a cell pair. The flow direction in the dilution and concentration compartment may be in parallel and in the same direction (concurrent flow), in parallel and in the opposite direction (counter flow), perpendicular to each other (cross flow), or at an angle.

In electrochemical separation stages, the electric field is generally applied to the compartments from a source of voltage and electric current applied to the first and second electrodes. The voltage and current source, referred to herein collectively as the "power supply," may be itself powered by a variety of systems, such as an AC power source, or, for example, a power source derived from solar, wind, or wave power.

At the electrode-liquid interfaces, electrochemical half-cell reactions may occur that initiate and/or facilitate the transfer of ions through the membranes and compartments. The specific electrochemical reactions that occur at the electrode and membrane interfaces may be partially controlled by ionic concentration in the specialized compartments that house the electrode assemblies. For example, a feed to the anode electrolyte compartments that is high in sodium chloride may tend to generate chlorine gas and hydrogen ions, while such a feed to the cathode electrolyte compartment will tend to generate hydrogen gas and hydroxide ions.

Generally, the hydrogen ion generated at the anode compartment may associate with a free anion, such as chloride ion, to preserve charge neutrality and create hydrochloric acid solution. Analogously, the hydroxide ion generated at the cathode compartment may associate with a free cation, such as sodium, to preserve charge neutrality and create sodium hydroxide solution. The reaction products of the electrode compartments, such as generated chlorine gas and sodium hydroxide, may be utilized in the process as needed for disinfection purposes, for membrane cleaning and defouling purposes, and for pH adjustment purposes. Systems and methods disclosed herein may comprise an electrode feed line configured to deliver an electrode stream to the electrodes, an electrode line fluidly connecting the first and second electrodes to each other, and an electrode reject line configured to discharge electrode line waste. The electrodes may be fed with dilute water, for example, water from the first feed line, or with another specialized solution.

One factor that facilitates the operation of electrochemical separation stages in systems of the present invention is reducing the difference in solute concentrations between the dilution and concentration compartments of the electrochemical separation stages. An increase in the solute concentration difference between the feed water to the concentrate stream and the feed water to the dilute stream has detrimental effects on total energy consumption required to produce product water. The first is an increase in the Donnan potential difference between the dilution and concentration compartments separated by a semi-permeable membrane. The increase in the Dolman potential difference reduces the current efficiency of the electrochemical separation stages, and therefore increases the current required to operate the electrochemical separation stage with a higher voltage drop across the electrodes of the electrochemical separation stage. This results in increased power consumption per unit product water (for example, measured as $kWh/m^3$) discharged from the system. The second is an increase in osmotic water loss from the dilution compartment to the concentration compartment. More diluate lost to the concentration compartment of the electrochemical separation stage reduces the product flow rate, and in particular, reduces the amount of product water produced from a given input of brackish water. Maximizing the fraction of brackish water that is converted to product water may be a major objective of the process. The fraction of converted brackish water is referred to herein as "recovery." Recovery is generally expressed as a percentage. Increasing recovery may reduce the capital and operating cost per unit product. For example, a high recovery may reduce the need or extent to which pretreatment of the feed water is necessary, thus reducing the cost of pretreating the brackish water. Maximizing production rate and recovery may also be beneficial because many of these applications are driven by water shortage, water use restrictions, or limitations on discharge. In the present invention, the recovery of water at an individual electrochemical separation stage or an electrochemical separation stage comprising a plurality of electrochemical separation stages is greater than about 50%, such as greater than about 60%, greater than about 65%, greater than about 70%, greater than about 75%, greater than about 80%, greater than about 85%, greater than about 90%, or greater than about 95%. Preferably, the recovery of water at an individual electrochemical separation stage or an electrochemical separation stage comprising a plurality of electrochemical separation stages is greater than about 80%, such as greater than about 85%, greater than about 90%, or greater than about 95%. Most preferably, the recovery of water at an individual electrochemical separation stage or an electrochemical separation stage comprising a plurality of electrochemical separation stages is greater than about 85% or greater than about 95%.

The present invention achieves high water recovery from brackish water, high purity of the product water, and a reduced energy consumption by removing a volume of ionic contaminants from the brackish water with one or more fluid connections between various flow points within the system. The term "fluidly connected," as used herein, refers to a connection between at least two system elements that allows for fluid to move between such system elements with or without passing through one or more intervening system elements. The connections are configured to minimize the difference in solute concentration between the depletion and concentration compartments of the electrochemical separation stages. In particular, systems of the present invention include a fluid connection between the concentrate outlet of the second electrochemical separation stage and the concentration compartment of the first electrochemical separation stage, and a volume of concentrate from the second electrochemical separation stage concentration compartment may be used as the make-up water for the first electrochemical separation stage concentration compartment to balance the solute concentration between the dilution and the concentration compartments of the first and the second electrochemical separation stages. Other fluid paths and fluid connections in systems of the present invention may be used to achieve a reduction in the solute concentration between the dilution and the concentration compartments of the first and the second electrochemical separation stages. As a non-limiting example, in some embodiments, a source of brackish water may be further fluidly connectable to the concentration compartment of the second electrochemical separation stage, and a volume of brackish water from a source of brackish water may be used as the make-up water for the second electrochemical separation stage concentration compartment. In another non-limiting example, a diluate outlet of the first electrochemical separation stage may be further fluidly connectable to the concentration compartment of the second electrochemical separation stage, and a volume of a diluate from the first electrochemical separation stage may be used as the make-up water for the second electrochemical separation stage concentration compartment. In some cases, a volume of a diluate from the first electrochemical separation stage may be used as a feed for the dilution compartment of the second electrochemical separation stage concentration compartment. In any of these configurations, flows through the dilution and concentration compartments of the first and second electrochemical separation stages are counter-current: the solute concentration difference between the feed to the concentration compartments and the feed to the dilute compartments is lower for the second electrochemical separation stage but higher for the first electrochemical separation stage.

In some cases, the first and/or second electrochemical separation stage may include a plurality of fluidly connected electrochemical separation devices, herein called modules, each having a dilution compartment and a concentration compartment. For example, a first and/or second electrochemical separation stage may include from 1 to 100 individual electrochemical separation modules, from 1 to 20, from 10 to 40, from 20 to 50, or from 40 to 80 individual electrochemical separation modules. The number of individual electrochemical separation modules in each of the first and the second electrochemical separation stages may be the same or may be different. For example, the first electrochemical separation stage may have a greater number of individual electrochemical separation modules that the second electrochemical separation stage, or the second electrochemical separation stage may have a greater number of individual electrochemical separation module that the first electrochemical separation stage.

Each electrochemical separation module may be assembled from a plurality of building blocks, herein called sub-blocks. Each sub-block may contain from 1 to 10, from 10 to 50, from 50 to 100, or from 100 to 200 cell pairs. A plurality of sub-blocks may be arranged with the inlets and outlets to the dilution compartments, and the inlets and outlets to the concentration compartments in each sub-block are fluidly connected to the respective inlets and outlets in the other sub-blocks. A dilution stream flows through the dilution compartments of all sub-blocks in parallel, and a concentration stream flows through the concentration compartments of all sub-blocks in parallel.

A plurality of sub-blocks may also be arranged so that the dilution stream and the concentration stream flow through their respective compartments in each sub-block in series. The flow path through each sub-block is herein called a pass.

Each pass may contain a plurality of sub-blocks in parallel. The dilution stream and the concentration stream flow through their respective compartments in the sub-blocks in first pass, then through their respective compartments in the sub-blocks in second pass, and so forth.

If the number of sub-blocks in each pass are the same, then the arrangement of sub-blocks in an electrochemical separation module may be described as x number of passes with y number of sub-blocks per pass, where x and y may typically be a number from 1 to 10. If the number of sub-blocks in each pass are different, then the arrangement of sub-blocks in an electrochemical separation module may be described as by the number of sub-blocks per pass separated by hyphens. For example, a module with fours sub-blocks in the first and second pass and two sub-blocks in the third and fourth pass may be described as 4-4-2-2.

In some embodiments, systems of the present invention may include a break tank fluidly connectable between the concentration compartments of the first and the second electrochemical separation modules. The break tank may be configured to hold concentrate from the second electrochemical separation module and can, via a pump, discharge a volume of the second concentrate to the concentration compartments of the first electrochemical separation module.

In some cases, a system of the present invention may include first and second electrochemical stages, each stage including a first and second electrochemical separation sub-stages, with each of the first and the second electrochemical separation sub-stages including a plurality of individual electrochemical separation modules as described herein. The first and second electrochemical separation sub-stages of the first and second electrochemical stages may have the same number of individual electrochemical separation modules, or each may have different numbers of individual electrochemical separation modules. Systems of the present invention including first and second electrochemical separation stages having first and second electrochemical separation sub-stages may include fluid connections configured to reduce the difference in solute concentration between the dilution and the concentration compartments of the electrochemical separation modules of the first and second electrochemical separation stages. For example, in embodiments of systems including first and second electrochemical separation stages having first and second electrochemical separation sub-stages, a concentrate outlet of the first electrochemical separation stage may be fluidly connectable to the dilution compartment and the concentration compartment of the second electrochemical stage. As another example, in embodiments of systems including first and second electrochemical separation stages having first and second electrochemical separation sub-stages, a diluate outlet of the second electrochemical stage may be fluidly connectable to a source of water, such as brackish water. As yet another example, in embodiments of systems including first and second electrochemical separation stages having first and second electrochemical separation sub-stages, a source of water, such as brackish water, may be fluidly connectable to the concentration compartments of the first electrochemical stage. These fluid connections are configured to reduce the solute concentration difference between the dilution and concentration chambers of the individual electrochemical separation modules within the first and second electrochemical separation sub-stages of the first and second electrochemical separation stages.

In the systems and methods of the present invention, the total energy consumption to produce a product water from brackish water, whether the product water be potable or require further treatment, is less than about 5 kWh/m$^3$ of product water. For instance, the total energy consumption for systems of the invention may be less than about 4 kWh/m$^3$ of product water, less than about 3 kWh/m$^3$ of product water, less than about 2 kWh/m$^3$ of product water, or less than less than about 1 kWh/m$^3$ of product water. Preferably, the total energy consumption to produce a product water from brackish water is less than about 4 kWh/m$^3$ of product water. In certain embodiments, the total energy consumption to produce a product water from brackish water is less than about 2 kWh/m$^3$ of product water. In particular embodiments, the total energy consumption to produce a product water from brackish water is less than about 1 kWh/m$^3$ of product water. By "total energy consumption," it is meant the overall energy consumed to operate the system as a whole, including the required energy to drive the electrodes of the electrochemical separation modules and/or electrochemical separation stages and the required energy to distribute water throughout the system, including pumps, valves, regulators, and other fluid handling components.

Electrochemical separation may be used to treat seawater, brackish, river, or well water for municipal and industrial use, for example, by desalting the source water. It may also be used to treat wastewater. One non-limiting example of wastewater treated with electrochemical separation is reverse osmosis (RO) reject for reuse or recycle. These water sources may contain multiple types of ions. For example, the brackish water feed may include ions that react to form precipitates and scale, such as, $Ca(HCO_3)_2$, $CaCO_3$, $CaSO_4$, and $Mg(OH)_2$, other salts, such as sodium salts, including $NaHCO_3$, and silicate minerals. The brackish water feed may have a total dissolved salts (TDS) concentration of about 1,500 ppm to 10,000 ppm. For instance, the feed water may have a TDS concentration of about 9,000 ppm, about 8,000 ppm, about 7,000 ppm, about 6,000 ppm, about 5,000 ppm, about 4,000 ppm, about 3,000 ppm, about 2,000 ppm, or about 1,500 ppm TDS. Seawater or estuary water may have a concentration of total dissolved salts in a range of about 10,000 to about 45,000 ppm. In certain examples, the seawater or estuary water may have a concentration of total dissolved salts of about 35,000 ppm. Brine, having a total dissolved salts content in a range of about 50,000 ppm to about 150,000 ppm may be treated to produce potable water. In some embodiments, brine, having a total dissolved salts content in a range of about 50,000 ppm to about 150,000 ppm may be treated to produce a water having a lower total dissolved salts content for purposes of disposal, for example, to a body of water, such as an ocean. Potable water typically has a TDS content of less than about 1,500 ppm. In some embodiments, potable water may have a TDS of less than about 1,000 ppm. In some cases, potable water may have a TDS content of less than about 500 ppm. In some non-limiting embodiments, potable water may have a TDS content of less than about 250 ppm. In some cases, the brackish water treated by systems and methods of the invention is treated to reduce the TDS content by an amount that renders the water suitable for a purpose other than potable water, such as water for crop irrigation. This water may then be further treated using another water treatment system, such as RO or other available water treatments.

In some embodiments, the system further comprises a control system configured to regulate feed directed to the concentration compartments of the first and the second electrochemical separation stages. The control system is configured to control the source and the flowrate of make-up feed water directed to the concentration compartments of the first and the second electrochemical separation stages. This control of the source and flowrate of the make-up water feed water directed to the concentration compartments of the first and the second electrochemical separation stages may allow the system to maintain a total energy consumption of less than about 4 kWh/m$^3$ of product water. This control of the source and flowrate of the make-up water feed water directed to the concentration compartments of the first and the second electrochemical separation stages may further allow for the lessening of the Donnan potential difference between the dilution and the concentration compartments of the first and the second electrochemical separation stages, thereby reducing energy consumption. This control of the source and flowrate of the make-up water feed water directed to the concentration compartments of the first and the second electrochemical separation stages may additionally allow for the lessening of osmotic water losses between the dilution and the concentration compartments of the first and the second electrochemical separation stages, thereby increasing the amount of water recovered.

The control system may furthermore be configured to regulate a volume of make-up feed, such as a concentrate from the second electrochemical separation stage, a diluate from the first electrochemical separation stage, or brackish water feed, when the ionic concentration of a concentrate or product reaches a predetermined threshold. For example, the control system may regulate a volume of a make-up feed when the TDS concentration of the concentrate of the first and/or the second electrochemical separation stage is greater than about 8,000 ppm. The control system may regulate a volume of a make-up feed when the TDS concentration is greater than about 9,000 ppm, greater than about 10,000 ppm, greater than about 11,000 ppm, greater than about 11,500 ppm, greater than about 12,000 ppm, greater than about 12,100 ppm, greater than about 12,200 ppm, greater than about 12,300 ppm, greater than about 12,400 ppm, or greater than about 12,500 ppm.

The control system may further be configured to regulate a volume of a make-up feed when the pressure within the recycle line reaches a predetermined value or pressure threshold. The pressure threshold may be reached when the average or absolute pressure across the first and/or second electrochemical separation stages reaches the predetermined value. The control system may further be configured to regulate a volume of a make-up feed when the pressure within the concentration compartment of the first and/or second electrochemical separation stages exhibits a predetermined differential. Specifically, the predetermined pressure differential across the concentration compartment of the first and/or second electrochemical separation stages may be measured as a pressure drop across the concentration compartment of the first and/or second electrochemical separation stages. The pressure may be measured at two or more points within the concentration compartment of the first and/or second electrochemical separation stages and/or a recycle line to determine the pressure differential.

The system may further comprise one or more sensors. In some embodiments, the system comprises a sensor fluidly connectable to the concentrate outlets of the first and the second electrochemical separation stages, with the sensor configured to measure at least one of the TDS concentration and flow rate. The one or more sensors may be configured to measure additional properties of fluids within systems of the invention, such as the pH of water or the pressure of water at one or more locations within the system. In some embodiments, the system comprises a sensor electrically connected to one or more electrodes, such as the first and second electrodes within the electrochemical separation stages and configured to measure the voltage and/or current across the electrodes. The control system may be electrically connected to the one or more sensors and configured to act in response to a measurement received from the one or more sensors. For instance, the control system may be electrically connected to a sensor that measures a property of the concentrate from the first and the second electrochemical separation stages and is configured to discharge a volume of concentrate from the second electrochemical separation stage in response to the sensor measurement of the concentrate, such as TDS or flow rate, from first electrochemical separation stage. As another non-limiting example, the control system may be electrically connected to a sensor that measures a property of the concentrate from the first and the second electrochemical separation stages and is configured to discharge a volume of the diluate from the first electrochemical separation stage in response to the sensor measurement of the concentrate from the second electrochemical separation stage. As yet another non-limiting example, the control system may be electrically connected to a sensor that measures a property of the concentrate from the first and the second electrochemical separation stages and is configured to discharge a volume brackish water feed from the source of brackish water in response to the sensor measurement of the concentrate from the second electrochemical separation stage.

The system may comprise one control system in electrical communication with any number of sensors or may comprise one control system in electrical communication with each sensor. The system may further comprise a control system hub connected to any number of control modules. In some embodiments, the control module(s) and sensor(s) are connected by one or more wires. In some embodiments, the control module(s) and sensor(s) are connected wirelessly. Similarly, the one or more control modules may be connected to the one or more valves on the recycle line by wires or wirelessly. In some embodiments, a control system is comprised within a valve, such that the valve itself is configured to open and close automatically, on a timer, or in response to a received measurement from a sensor.

In accordance with another aspect, there is provided a method of treating brackish water to produce potable water. The method may comprise introducing brackish water from a source of brackish water to an inlet of a first electrochemical separation stage dilution compartment and treating the brackish water in the first electrochemical separation stage to produce a diluate. The method may further comprise determining an amount of the diluate to direct to an inlet of a second electrochemical separation stage dilution compartment and treating the diluate of the first electrochemical separation stage in the second electrochemical separation stage to produce a potable water having a concentration of dissolved salts of less than about 500 ppm. The overall product recovery rate may be greater than 90% and may be maintained by controlling a source and a flowrate of a make-up feed water directed to concentration compartments of the first and the second electrochemical separation stages as described herein.

In some embodiments, the method of treating brackish water to produce potable water may include directing a volume of a concentrate from the concentration compartment of the second electrochemical separation stage to the concentration compartment of the first electrochemical separation stage. The method of treating brackish water to produce potable water may further include directing a volume of brackish water from the source of brackish water to the concentration compartment of the second electrochemical separation stage. The method of treating brackish water to produce potable water may additionally include directing a volume from the diluate of the first electrochemical separation stage to the concentration compartment of the second electrochemical separation stage. In some cases, the control of the make-up feed water may maintain a total energy consumption of less than 4 kWh/m$^3$ of product water, may lessen the Donnan potential difference between the dilution and the concentration compartments of the first and the second electrochemical separation stages, and may reduce osmotic water losses between the dilution and the concentration compartments of the first and the second electrochemical separation stages.

In accordance with another aspect, there is provided a method of treating brackish water. The method may comprise introducing brackish water from a source of brackish water to an inlet of a dilution compartment of a plurality of electrochemical separation modules of a first electrochemical separation stage, treating the brackish water in the first electrochemical separation stage to produce a first diluate and a first concentrate, and recovering the first diluate as a product water. The method may further comprise directing the first concentrate to an inlet of a dilution compartment of a plurality of electrochemical separation modules of a second electrochemical separation stage and treating the first concentrate in the second electrochemical separation stage to produce a second diluate and a second concentrate. Lessening of the Donnan potential difference between the dilution and the concentration compartments of the first and the second electrochemical separation modules may be achieved by controlling a source and a flowrate of a make-up feed water directed to concentration compartments of the first and the second electrochemical separation modules as described herein. The product water that is produced by thus method may be used for an application that does not require potable water or may be used as the feed water for a further water treatment process, such as RO or similar.

In some embodiments, the method of treating brackish water may include directing a volume of the first concentrate to the concentration compartments of the second electrochemical separation stage. The method of treating brackish water may further include directing the second diluate to the source of brackish water. The method of treating brackish water to produce potable water may additionally include directing a volume of brackish water from the source of brackish water to the concentration compartments of the first electrochemical separation stage. In some cases, the control of the make-up feed water may reduce osmotic water losses between the dilution and the concentration compartments of the first and the second electrochemical separation modules, may maintain an overall product water recovery rate of greater than about 85%, and maintain a total energy consumption of less than 1.5 kWh/m³ of product water.

The function and advantages of the embodiments discussed above and other embodiments of the invention can be further understood from the description of the figures below, which further illustrate the benefits and/or advantages of the one or more systems and techniques of the invention but do not exemplify the full scope of the invention.

As shown in the exemplary schematic drawing of FIG. 1, a water treatment system comprises first and second electrochemical separation stages 110, 120, each electrochemical separation stage comprising a dilution compartment 130 and a concentration compartment 140. The system comprises a first feed line 100 fluidly connected to the dilution compartment 130 of the first electrochemical separation stage 110 and a second feed line 102 fluidly connected to the concentration compartment 140 of the second electrochemical separation stage 120. The dilution compartment 130 of the first electrochemical separation stage 110 is fluidly connected to the dilution compartment 130 of the second electrochemical separation stage 120 by diluate outlet 104. Product line 106 discharges treated water from the dilution compartment 130 of the second electrochemical separation stage 120. The second feed line 102 is configured to allow the feed stream to reach the concentration compartment 140 of the second electrochemical separation stage 120 through second electrochemical separation stage recycle line 160. The second electrochemical separation stage recycle line 160 may further comprise a pump 190 configured to pump the concentrate 180 of the concentration compartment 140 of the second electrochemical separation stage 120 back to an inlet of the concentration compartment 140 of the second electrochemical separation stage 120. The concentration compartment 140 of the first electrochemical separation stage 110 includes a first electrochemical separation stage recycle line 150 that, with a pump 190, is configured to pump the concentrate 170 of the concentration compartment 140 of the first electrochemical separation stage 110 back to an inlet of the concentration compartment 140 of the first electrochemical separation stage 110. The system may further comprise a break tank 112 that receives concentrate 180 of the concentration compartment 140 of the second electrochemical separation stage 120. If included, break tank 112 may be connected to a pump 190 that returns concentrate 180 of the concentration compartment 140 of the second electrochemical separation stage 120 back to an inlet of the concentration compartment 140 of the first electrochemical separation stage 110 through break tank discharge line 114.

Figure 2:
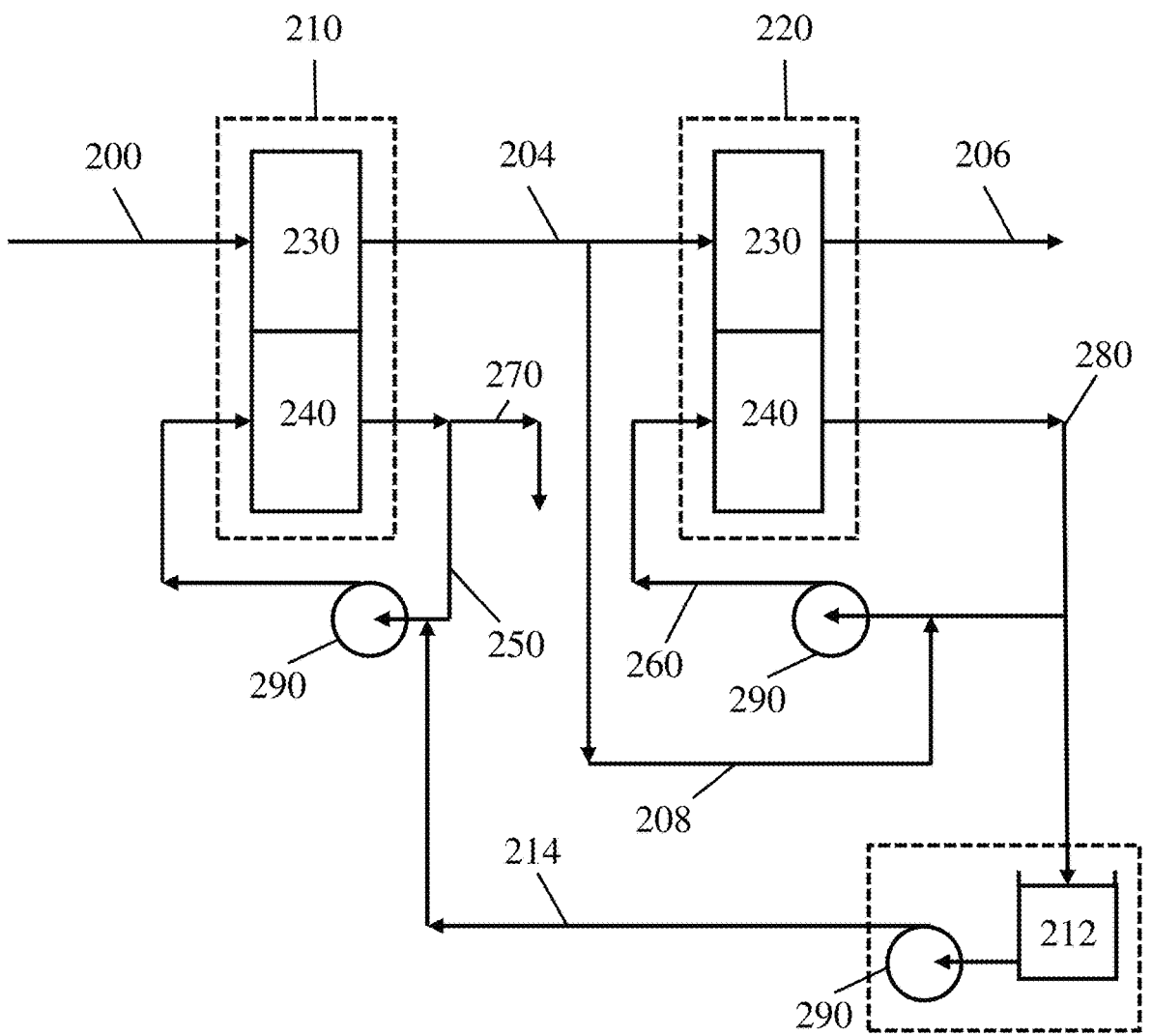
FIG. 2 is a schematic drawing of a water treatment system, in accordance with certain embodiments.

As shown in the exemplary schematic drawing of FIG. 2, a water treatment system comprises first and second electrochemical separation stages 210, 220. The first and second electrochemical separation stages 210, 220 may include a plurality of electrochemical separation modules, each comprising a dilution compartment 230 and a concentration compartment 240. The system comprises a first feed line 200 fluidly connected to the dilution compartment 230 of the first electrochemical separation stage 210. The dilution compartment 230 of the first electrochemical separation module 210 is fluidly connected to the dilution compartment 230 of the second electrochemical separation stage 220 by diluate outlet 204. Product line 206 discharges treated water from the dilution compartment 230 of the second electrochemical separation stage 220. The diluate outlet 204 includes a split diluate feed 208 that is configured to allow the diluate from the dilution compartment 230 of the first electrochemical separation stage 210 to reach the concentration compartment 240 of the second electrochemical separation stage 220 through recycle loop 260. The second recycle loop 260 may further comprise a pump 290 configured to recirculate the concentrate 280 of the concentration compartment 240 of the second electrochemical separation stage 220 back to an inlet of the concentration compartment 240 of the second electrochemical separation stage 220. The concentration compartment 240 of the first electrochemical separation stage 220 includes a first recycle loop 250 that, with a pump 290, is configured to recirculate the concentrate 270 of the concentration compartment 240 of the first electrochemical separation stage 210 back to an inlet of the concentration compartment 240 of the first electrochemical separation stage 210. The system may further comprise a break tank 212 that receives concentrate 280 of the concentration compartment 240 of the second electrochemical separation stage 220. If included, break tank 212 may be connected to a pump 290 that recycles concentrate 280 of the concentration compartment 240 of the second electrochemical separation stage 220 back to the inlet of the concentration compartment 240 of the first electrochemical separation stage 210 through break tank discharge line 214.

Figure 3:
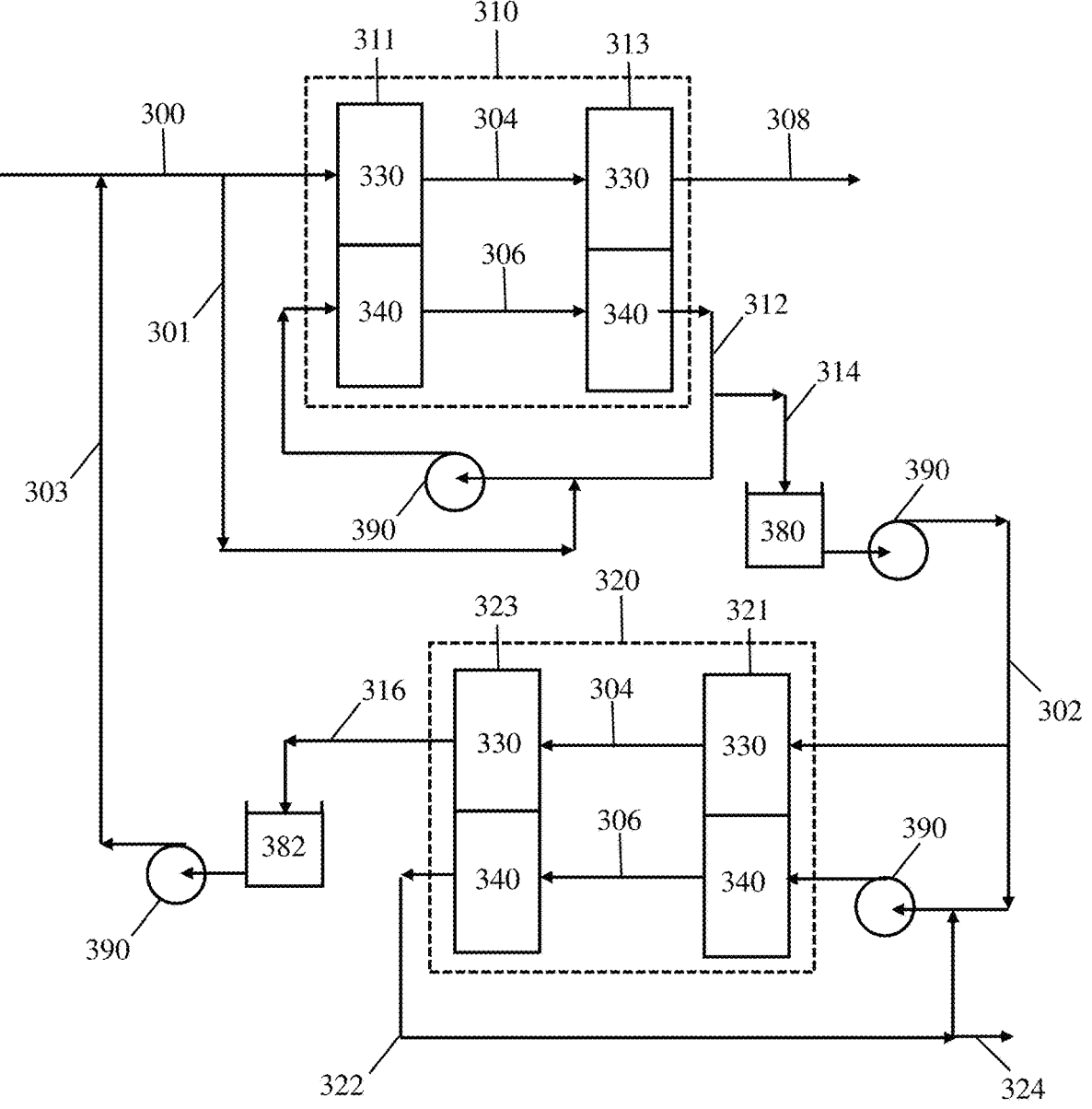
FIG. 3 is a schematic drawing of a water treatment system having two electrochemical separation stages, in accordance with certain embodiments.

As shown in the exemplary schematic drawing of FIG. 3, a water treatment system comprises first and second electrochemical separation stages 310, 320. Within each of the first and second electrochemical separation stages 310, 320 are first and second electrochemical separation sub-stages 311 and 313, each sub-stage comprising a plurality of electrochemical separation modules, each comprising a dilution compartment 330 and a concentration compartment 340. The system comprises a first feed line 300 fluidly connected to the dilution compartment 330 of the first sub-stage 311 of the first electrochemical stage 310.

The dilution compartment 330 of the first sub-stage 311 is fluidly connected to the dilution compartment 330 of the second sub-stage 313 by diluate outlet 304 and the concentration compartment 340 of the first sub-stage 311 is fluidly connected to the concentration compartment 340 of the second sub-stage 313 by concentrate outlet 306. First product line 308 discharges treated water from the dilution compartment 330 of the second sub-stage 313 of the first electrochemical stage 310. The system further comprises a second feed line 301, split from the first feed line 300, that is configured to allow the feed stream to reach the concentration compartments 340 of the first and second sub-stages 311, 313 of the first electrochemical separation stage 310 through recycle loop 312. The recycle loop 312 may further comprise a pump 390 configured to recirculate the concentrate 312 of the concentration compartment 340 of the second sub-stage 313 back to an inlet of the concentration compartment 340 of the first sub-stage 311 of the first electrochemical separation stage 310. The first concentrate 314 of the first electrochemical separation stage 310 is passed to a first break tank 380.

First break tank 380 may be fluidly connected to the dilution compartment 330 and concentration compartment 340 of the first sub-stage 313 of the second electrochemical stage 320 by third feed line 302. The dilution compartment 330 of the first sub-stage 311 is fluidly connected to the dilution compartment 330 of the second sub-stage 313 by diluate outlet 304 and the concentration compartment 340 of the first sub-stage 311 is fluidly connected to the concentration compartment 340 of the second sub-stage 313 by concentrate outlet 306.

Second product line 316 discharges treated water from the dilution compartment 330 of the second sub-stage 313 of the second electrochemical stage 320 into second break tank 382. The second electrochemical separation stage 320 includes a recycle loop 322 that, with a pump 390, is configured to recirculate the concentrate 322 of the concentration compartment 340 of the second sub-stage 323 back to an inlet of the concentration compartment 340 of the first sub-stage 321 of the second electrochemical separation stage 320. The second break tank 382 is configured to, with pump 390, deliver the product of the second electrochemical stage 320 back to the first feed line 300 of the system through fourth feed line 303. Second concentrate outlet 324 discharges concentrate.

EXAMPLES

Example 1

In this example, the operation of a water treatment system comprising two stages of electrodialysis modules, was simulated. Each stage included 26 electrodialysis modules, each having a dilution compartment and a concentration compartment. A system of this design is exemplified in FIG. 1. The feed water was simulated at 6,710 ppm TDS with a feed flow of 174.1 m$^3$/hr. The voltage applied at the first electrodialysis stage was simulated at 502 VDC with a simulated current of 26 A per individual module. The voltage applied at the second electrodialysis stage was simulated at 428 VDC with a simulated current of 6.4 A per individual module. The system performed at a TDS removal rate of 94.2%, such that the product had a TDS concentration of 391 ppm and the concentrate had a TDS concentration of 63,583 ppm. The system performed with an overall recovery of 90.6% and a total energy consumption of 3.07 kWh/m$^3$ of water, with the total energy consumption including driving the electrochemical separation modules and all pumps used to distribute water.

Each electrodialysis module includes twelve sub-blocks, arranged so that the dilution and concentration streams flow through four sub-blocks in parallel in the first pass, four sub-blocks in parallel in the second pass, two sub-blocks in parallel in the third pass, and two sub-blocks in parallel in the fourth pass. The arrangement of sub-blocks may be described as 4-4-2-2.

Example 2

In this example, the operation of a water treatment system comprising two stages of electrodialysis modules, was simulated. The first stage included 28 electrodialysis modules and the second stage included 26 electrodialysis modules, each having a dilution compartment and a concentration compartment. A system of this design is exemplified in FIG. 2. The feed water was simulated at 6,710 ppm TDS with a feed flow of 175.8 m$^3$/hr. The voltage applied at the first electrodialysis stage was simulated at 502 VDC with a simulated current of 26.4 A per individual module. The voltage applied at the second electrodialysis stage was simulated at 424 VDC with a simulated current of 6.3 A per individual module. The system performed at a TDS removal rate of 94.6%, such that the product had a TDS concentration of 365 ppm and the concentrate had a TDS concentration of 68,591 ppm. The system performed with an overall recovery of 90% and a total energy consumption of 3.31 kWh/m$^3$ of water, with the total energy consumption including driving the electrodialysis modules and all pumps used to distribute water.

Each electrodialysis module includes twelve sub-blocks, arranged so that the dilution and concentration streams flow through four sub-blocks in parallel in the first pass, four sub-blocks in parallel in the second pass, two sub-blocks in parallel in the third pass, and two sub-blocks in parallel in the fourth pass. The arrangement of sub-blocks may be described as 4-4-2-2.

Example 3

In this example, the operation of a water treatment system comprising two stages of electrodialysis modules, was simulated. The first stage included 20 electrodialysis modules and the second stage included 8 electrodialysis modules, each having a dilution compartment and a concentration compartment. A system of this design is exemplified in FIG. 1. The feed water was simulated at 2,790 ppm TDS with a feed flow of 142 m$^3$/hr. The voltage applied at the first electrodialysis stage was simulated at 366 VDC with a simulated current of 4.8 A per individual module. The voltage applied at the second electrodialysis stage was simulated at 491 VDC with a simulated current of 2.3 A per individual module. The system performed at a TDS removal rate of 90.2%, such that the product had a TDS concentration of 274 ppm and the concentrate had a TDS concentration of 17,056 ppm. The system performed with an overall recovery of 85% and a total energy consumption of 0.51 kWh/m$^3$ of water, with the total energy consumption including driving the electrodialysis modules and all pumps used to distribute water.

Each electrodialysis module includes twelve sub-blocks, arranged so that the dilution and concentration streams flow through four sub-blocks in parallel in the first pass, four sub-blocks in parallel in the second pass, two sub-blocks in parallel in the third pass, and two sub-blocks in parallel in the fourth pass. The arrangement of sub-blocks may be described as 4-4-2-2.

Example 4

In this example, the operation of a water treatment system comprising two stages of electrodialysis modules, was simulated. The first stage includes two sub-stages of electrodialysis modules, each sub-stage having 36 electrodialysis modules, each having a dilution compartment and a concentration compartment. The first stage modules were configured to receive brackish water as feed and the sub-blocks were arranged in two passes, each with 4 sub-blocks as defined herein. The brackish water modules simulated were NEXED 6-8A-1 modules (Evoqua Water Technologies LLC, Pittsburgh, Pa.). The second electrodialysis stage, fed by the concentrate of the first electrodialysis stage, includes two sub-stages of electrodialysis modules, each sub-stage having 6 electrodialysis modules, each having a dilution compartment and a concentration compartment. The second stage modules were configured for high salinity feed water and had 5 passes, each with 4 sub-blocks per pass. The high salinity water modules simulated were NEXED SWI 6-20B modules (Evoqua Water Technologies LLC, Pittsburgh, Pa.). A system of this design is exemplified in FIG. 3. The feed water into the first stage (and balanced with the product water from the second stage) was simulated at 7,585 ppm TDS with a total feed flow of 183.4 m$^3$/hr. The total power required to operate the first electrodialysis stage was 119.7 kW, with a total energy consumption of 0.77 kWh/m$^3$. The total power required to operate the second electrodialysis stage was 76 kW, with a total energy consumption of 0.49 kWh/m$^3$. The system performed at a TDS removal rate of 70.3%, such that the product had a TDS concentration of 2,250 ppm, with the first concentrate of the first stage at a TDS concentration of 37,800 ppm and the second concentrate of the second stage at a TDS concentration of 91,085 ppm. The system performed with an overall recovery of 94% (with the recovery at the first stage being 85%, recovering 155.9 m$^3$/hr of total feed water, and the recovery at the second stage being 63.8%, with a concentrate discharge of 9.95 m$^3$/hr) and a total energy consumption of 1.26 kWh/m$^3$ to produce treated water.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of an electrochemical water treatment system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure and are intended to be within the spirit and scope of the disclosure. In other instances, an existing facility may be modified to utilize or incorporate any one or more aspects of the methods and systems described herein. Thus, in some instances, the methods may involve operating an electrochemical separation device. Accordingly, the foregoing description and figures are by way of example only. Further the depictions in the figures do not limit the disclosures to the particularly illustrated representations.

While exemplary embodiments are disclosed herein, many modifications, additions, and deletions may be made therein without departing from the spirit and scope of the inventive aspects and their equivalents, as set forth in the following claims.

What is claimed is:

1. A system for treating brackish water, the system comprising:

a first electrochemical separation stage having a dilution compartment inlet fluidly connectable to a source of brackish water, a concentration compartment, a diluate outlet, and a concentrate outlet; and a second electrochemical separation stage positioned downstream of the first electrochemical separation stage and having a dilution compartment inlet fluidly connectable to the diluate outlet of the first electrochemical separation stage, a concentration compartment, a product water outlet, and a concentrate outlet, the concentrate outlet of the second electrochemical separation stage fluidly connectable to the concentration compartment of the first electrochemical separation stage, the diluate outlet of the first electrochemical separation stage being directly fluidly connected to a first conduit in a recycle loop including a direct fluid connection from the concentrate outlet of the second electrochemical separation stage to a pump and directly from the pump to the concentration compartment of the second electrochemical separation stage, and a second conduit, the second conduit having a direct fluid communication connection with the first conduit, the direct fluid connection of the second conduit with the first conduit being between the concentrate outlet of the second electrochemical separation stage and the direct fluid connection of the diluate outlet of the first electrochemical separation stage to the first conduit, the second conduit providing for the concentrate outlet of the second electrochemical separation stage to be fluidly connectable to the concentration compartment of the first electrochemical separation stage.

2. The system of claim 1, wherein the source of brackish water is further fluidly connectable to the concentration compartment of the second electrochemical separation stage.

3. The system of claim 1, further comprising a break tank fluidly connectable between the concentration compartments of the first and the second electrochemical separation stages.

4. The system of claim 1, further comprising a sensor fluidly connectable to the concentrate outlets of the first and the second electrochemical separation stages, the sensor configured to measure at least one of total dissolved salt (TDS) concentration and flow rate.

5. The system of claim 4, wherein a control system is electrically connected to the sensor and configured to regulate a volume of concentrate from the second electrochemical separation stage in response to the sensor measurement of the concentrate from first electrochemical separation stage.

6. The system of claim 4, wherein a control system is electrically connected to the sensor and configured to regulate a volume of diluate from the first electrochemical separation stage in response to the sensor measurement of the concentrate from the second electrochemical separation stage.

7. The system of claim 4, wherein a control system is electrically connected to the sensor and configured to regulate a volume of brackish water feed from the source of brackish water in response to the sensor measurement of the concentrate from the second electrochemical separation stage.

8. The system of claim 1, further comprising a control system configured to regulate feed directed to the concentration compartments of the first and the second electrochemical separation stages to lessen a Donnan potential difference and osmotic water losses between the dilution and concentration compartments of the first and the second electrochemical separation stages, and to maintain an overall product water recovery rate of greater than about 90% having a concentration of dissolved salts of less than about 500 ppm, the control system further configured to maintain a total energy consumption of less than about 4 kWh/m³ of product water.

9. A method of treating brackish water to produce potable water, the method comprising the steps of:

introducing brackish water from a source of brackish water to the dilution compartment inlet of the first electrochemical separation stage of the system of claim 1;

treating the brackish water in the first electrochemical separation stage to produce a diluate;

determining an amount of the diluate to direct to the dilution compartment inlet of the second electrochemical separation stage;

treating the diluate of the first electrochemical separation stage in the second electrochemical separation stage to produce potable water having a concentration of dissolved salts of less than about 500 ppm; and controlling a source and a flowrate of a make-up feed water directed to the concentration compartments of the first and the second electrochemical separation stages to maintain an overall product water recovery rate of greater than about 90%.

10. The method of claim 9, further comprising directing a volume of a concentrate from the concentration compartment of the second electrochemical separation stage to the concentration compartment of the first electrochemical separation stage.

11. The method of claim 9, further comprising directing a volume of brackish water from the source of brackish water to the concentration compartment of the second electrochemical separation stage.

12. The method of claim 9, further comprising directing a volume from the diluate compartment of the first electrochemical separation stage to the concentration compartment of the second electrochemical separation stage.

13. The method of claim 9, further comprising controlling the source and the flowrate of the make-up feed water directed to the concentration compartments of the first and the second electrochemical separation stages to maintain a total energy consumption of less than about 4 kWh/m³ of product water.

14. The method of claim 13, further comprising controlling the source and the flowrate of the make-up feed water directed to the concentration compartments of the first and the second electrochemical separation stages to lessen the Donnan potential difference between the dilution and the concentration compartments of the first and the second electrochemical separation stages.

15. The method of claim 13, further comprising controlling the source and the flowrate of the make-up feed water directed to the concentration compartments of the first and the second electrochemical separation stages to lessen osmotic water losses between the dilution and the concentration compartments of the first and the second electrochemical separation stages.

16. A method of treating brackish water, the method comprising the steps of:

introducing brackish water from a source of brackish water to the dilution compartment inlet of the first electrochemical separation stage of the system of claim 1, wherein the first electrochemical separation stage comprises a plurality of electrochemical separation modules;

treating the brackish water in the first electrochemical separation stage to produce a first diluate and a first concentrate;

recovering the first diluate as a product water;

directing the first concentrate to the inlet of the dilution compartment inlet of the second electrochemical separation stage, wherein the second electrochemical separation stage comprises a plurality of electrochemical separation modules;

treating the first concentrate in the second electrochemical separation stage to produce a second diluate and a second concentrate; and controlling a source and a flowrate of a make-up feed water directed to the concentration compartments of the first and the second electrochemical separation modules of the first and the second electrochemical separation stages to lessen the Donnan potential difference between the dilution and the concentration compartments of the electrochemical separation modules of the first and the second electrochemical stages.

17. The method of claim 16, further comprising directing a volume of the first concentrate to the concentration compartments of the electrochemical separation modules of the second electrochemical separation stage.

18. The method of claim 16, further comprising directing the second diluate to the source of brackish water.

19. The method of claim 16, further comprising directing a volume of brackish water from the source of brackish water to the concentration compartments of the electrochemical separation modules of the first electrochemical separation stage.

20. The method of claim 16, further comprising controlling the source and the flowrate of the make-up feed water directed to the concentration compartments of the first and the second electrochemical separation stages to lessen osmotic water losses between the dilution and the concentration compartments of the electrochemical separation modules of the first and the second electrochemical separation stages.

21. The method of claim 16, further comprising controlling the source and the flowrate of the make-up feed water directed to the concentration compartments of the first and the second electrochemical separation stages to maintain an overall product water recovery rate of greater than about 85%.

22. The method of claim 16, further comprising controlling the source and the flowrate of the make-up feed water directed to the concentration compartments of the first and the second electrochemical separation stages to maintain a total energy consumption of less than about 1.5 kWh/m$^3$.

* * * * *